US009411975B2

(12) United States Patent
Smith et al.

(10) Patent No.: US 9,411,975 B2

(45) Date of Patent: Aug. 9, 2016

(54) METHODS AND APPARATUS TO SECURELY SHARE DATA

(71) Applicant: Intel Corporation, Santa Clara, CA (US)

(72) Inventors: Ned M. Smith, Beaverton, OR (US); Omer Ben-Shalom, Rishon Le-Zion (IL); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 14/230,618

(22) Filed: Mar. 31, 2014

(65) Prior Publication Data

US 2015/0278531 A1 Oct. 1, 2015

(51) Int. Cl.

| | |
|---|---|
| ***H04L 9/08*** | (2006.01) |
| ***G06F 21/62*** | (2013.01) |
| ***H04L 29/06*** | (2006.01) |

(52) U.S. Cl.

CPC .......... *G06F 21/6218* (2013.01); *H04L 63/10* (2013.01)

(58) Field of Classification Search

CPC .......... G06F 9/44; G06F 17/30; G06F 11/00; G06F 9/46; G06F 21/00; G06F 9/5055; G06F 8/68; G06F 9/45533; G06F 17/30575; G06F 11/1489; G06F 17/30088; G06F 17/30067; G06F 12/1483; G06F 21/562; G06F 21/62; G06F 21/78; G06F 11/146; H04L 9/00; H04L 9/0822; H04L 9/0894; H04L 67/34; H04L 67/10; H04L 9/32

USPC .......... 713/165, 180, 193; 726/22–24, 26, 30; 707/822, 679, 680, 681, 826, 803, 807, 707/809; 717/148; 718/100; 380/46

See application file for complete search history.

(56) References Cited

U.S. PATENT DOCUMENTS

| | | | |
|---|---|---|---|
| 682,346 | A | 9/1901 | Sims |
| 5,919,257 | A | 7/1999 | Trostle |
| 6,823,463 | B1 | 11/2004 | Challener et al. |
| 7,103,529 | B2 | 9/2006 | Zimmer |
| 7,127,579 | B2 | 10/2006 | Zimmer et al. |

(Continued)

FOREIGN PATENT DOCUMENTS

| | | |
|---|---|---|
| CN | 1912886 | 2/2007 |
| JP | 62-241040 | 10/1987 |

(Continued)

OTHER PUBLICATIONS

Worldtel Inc., "C.O.B.A.S. Centralized Out-Of-Band Authentication System," Sep. 8-9, 2003, 14 pages, http://www.cybersecuritycooperation.org/documents/QT__COBAS__White__Paper.pdf, Southeast Europe Cybersecurity Conference.

(Continued)

*Primary Examiner* — Thanhnga B Truong

(74) *Attorney, Agent, or Firm* — Hanley, Flight & Zimmerman LLC

(57) ABSTRACT

Methods and apparatus to securely share data are disclosed. An example includes generating, at a first device of a first user of cloud services, an archive file representative of a drive of the first device; encrypting, via a processor, the archive file to form an encrypted archive file; and conveying the encrypted archive file to a cloud service provider, the encrypted archive file to be decrypted by a second device of a second user of the cloud services, the decrypted archive file to be mounted to an operating system of the second device.

17 Claims, 11 Drawing Sheets

102
CLOUD SERVICE PROVIDER (CSP)
KEY MANAGER 110
ACCESS POLICY MANAGER 112
ARCHIVE FILE DATABASE 114
100
108
NETWORK
104
FIRST COMPUTING DEVICE
106
SECOND COMPUTING DEVICE

(56) References Cited

U.S. PATENT DOCUMENTS 7,260,848 B2 8/2007 Zimmer
7,299,354 B2 11/2007 Khanna et al.
7,320,052 B2 1/2008 Zimmer et al.
7,779,220 B1 8/2010 Pione
7,827,371 B2 11/2010 Yao et al.
8,103,883 B2 1/2012 Smith
8,130,960 B2 3/2012 Zimmer et al.
8,201,239 B2 6/2012 Smith et al.
8,327,415 B2 12/2012 Yao et al.
8,332,653 B2 12/2012 Buer
8,510,570 B2 8/2013 Smith et al.
8,572,757 B1 10/2013 Stamos et al.
8,588,422 B2 11/2013 Beachem et al.
8,589,680 B2 * 11/2013 De Atley ............. G06F 11/1464 713/165
8,621,196 B2 12/2013 Pasam et al.
8,667,273 B1 3/2014 Billstrom et al.
8,793,797 B2 * 7/2014 Meenakshisundaram G06F 12/1483 707/803
8,849,762 B2 * 9/2014 Kumarasamy ...... G06F 11/1469 707/646
8,856,512 B2 10/2014 Smith et al.
8,938,481 B2 * 1/2015 Kumarasamy .... G06F 17/30575 707/679
2001/0011947 A1 8/2001 Jaber et al.
2002/0120845 A1 8/2002 Cromer
2003/0023812 A1 1/2003 Nalawadi et al.
2003/0056051 A1 3/2003 Burke et al.
2003/0070099 A1 4/2003 Schwartz et al.
2003/0120918 A1 6/2003 VanDer Kamp
2003/0188179 A1 10/2003 Challener et al.
2003/0188193 A1 10/2003 Venkataramappa
2003/0229694 A1 12/2003 Tsai et al.
2004/0010579 A1 1/2004 Freese
2004/0059907 A1 3/2004 Cochran et al.
2004/0064457 A1 4/2004 Zimmer et al.
2004/0103324 A1 5/2004 Band
2004/0158711 A1 8/2004 Zimmer
2004/0250107 A1 12/2004 Guo
2004/0268113 A1 12/2004 Rothman et al.
2004/0268140 A1 12/2004 Zimmer et al.
2005/0021968 A1 1/2005 Zimmer et al.
2005/0039013 A1 2/2005 Bajikar et al.
2005/0071677 A1 3/2005 Khanna et al.
2005/0114686 A1 5/2005 Ball et al.
2005/0125648 A1 6/2005 Luciani et al.
2005/0138433 A1 6/2005 Linetsky
2005/0144609 A1 6/2005 Rothman et al.
2005/0228993 A1 10/2005 Silvester et al.
2005/0262361 A1 11/2005 Tilibadeau
2005/0262574 A1 11/2005 Allen
2006/0021018 A1 1/2006 Hinton et al.
2006/0037074 A1 2/2006 Yang
2006/0075230 A1 4/2006 Baird et al.
2006/0090084 A1 4/2006 Buer
2006/0230030 A1 10/2006 Volpa et al.
2006/0236127 A1 10/2006 Kurien et al.
2006/0242280 A1 10/2006 Zimmer et al.
2006/0259782 A1 11/2006 Wang et al.
2007/0005951 A1 1/2007 Davis et al.
2007/0038856 A1 2/2007 Ali et al.
2007/0061879 A1 3/2007 Dailey et al.
2007/0112772 A1 5/2007 Morgan et al.
2007/0180449 A1 8/2007 Croft et al.
2007/0282757 A1 12/2007 Pandya et al.
2008/0016313 A1 1/2008 Murotake et al.
2008/0052777 A1 2/2008 Kawano et al.
2008/0059804 A1 3/2008 Shah et al.
2008/0060068 A1 3/2008 Mabayoje et al.
2008/0077752 A1 3/2008 Kinoshita
2008/0077986 A1 3/2008 Rivera et al.
2008/0083019 A1 4/2008 Wang et al.
2008/0104701 A1 5/2008 Peacock et al.
2008/0120499 A1 5/2008 Zimmer et al.
2008/0130901 A1 6/2008 Danilak
2008/0162809 A1 7/2008 Rothman et al.
2008/0222423 A1 9/2008 Rodriguez et al.
2008/0288782 A1 11/2008 Iyer
2008/0294914 A1 11/2008 Lee et al.
2009/0006859 A1 1/2009 Zimmer et al.
2009/0031408 A1 1/2009 Thom et al.
2009/0067685 A1 3/2009 Boshra et al.
2009/0067688 A1 3/2009 Boshra et al.
2009/0070467 A1 3/2009 Khosravi et al.
2009/0070593 A1 3/2009 Boshra et al.
2009/0083833 A1 3/2009 Ziola et al.
2009/0110200 A1 4/2009 Srinivas
2009/0113544 A1 4/2009 Chancey et al.
2009/0172381 A1 7/2009 Zimmer et al.
2009/0222909 A1 9/2009 Challener et al.
2009/0254981 A1 10/2009 Devadas et al.
2009/0319806 A1 12/2009 Smith et al.
2009/0327678 A1 12/2009 Dutton et al.
2010/0011350 A1 1/2010 Zayas
2010/0023782 A1 1/2010 Prakash et al.
2010/0042710 A1 2/2010 Lin
2010/0082898 A1 4/2010 Mangold et al.
2010/0088525 A1 4/2010 Ureche et al.
2010/0169640 A1 7/2010 Smith et al.
2010/0169669 A1 7/2010 Smith
2010/0303240 A1 12/2010 Beachem et al.
2010/0306399 A1 12/2010 Khosravi et al.
2011/0002461 A1 1/2011 Erhart et al.
2011/0138166 A1 6/2011 Peszek et al.
2011/0154023 A1 6/2011 Smith et al.
2011/0246776 A1 10/2011 Deaver et al.
2012/0011364 A1 1/2012 Rubin
2012/0011565 A1 1/2012 Garlie et al.
2012/0017271 A1 1/2012 Smith et al.
2012/0131322 A1 5/2012 Smith et al.
2012/0163602 A1 6/2012 Zimmer et al.
2012/0167187 A1 6/2012 Smith et al.
2012/0179904 A1 7/2012 Dunn et al.
2013/0080765 A1 3/2013 Mohanty et al.
2013/0111196 A1 5/2013 Pasam et al.
2013/0142329 A1 6/2013 Bell et al.
2013/0275747 A1 10/2013 Brumback et al.
2014/0025941 A1 1/2014 Bulusu et al.
2014/0032933 A1 1/2014 Smith et al.
2014/0366116 A1 12/2014 Smith et al.
2015/0095638 A1 4/2015 Smith et al.

FOREIGN PATENT DOCUMENTS

JP 2002055891 2/2002
JP 2004005105 1/2004
JP 2006031714 2/2006
JP 2006-080636 3/2006
JP 2008052704 3/2008
JP 2010191946 9/2010
KR 100705380 4/2007
WO 2008065596 6/2008
WO 2009013673 1/2009
WO 2011084265 7/2011
WO 2011089143 7/2011
WO 2014018356 1/2014

OTHER PUBLICATIONS

Scarfone et al. “Guide to Storage Encryption Technologies for End User Devices,” Nov. 2007, 40 pages, NIST Special Pub. 800-111.

Perez et al. “Virtualization and Hardware-Based Security,” 2008, 8 pages, IEEE.

Intel Corporation, “3rd Generation Intel® Core™ vPro™ Processors”, www.intel.com/vPro, retrieved on Jul. 24, 2012, 4 pages.

Utimaco Safeware AG, “The two sites of Utimaco,” www.utimaco.com, 2009-2014, 2 pages.

Symantec Corporation, “Symantec Encryption”, www.pgp.com, retrieved on Feb. 18, 2014, 11 pages.

Wave Systems Corp., www.wave.com, 1997-2013, 1 page.

(56) References Cited

OTHER PUBLICATIONS

Patent Cooperation Treaty, "International Search Report," issued in connection with Application No. PCT/US2015/018941, May 28, 2015, 3 pages.
Patent Cooperation Treaty, "Written Opinion," issued in connection with Application No. PCT/US2015/018941, May 28, 2015, 10 pages.
Menezes et al., "Handbook of Applied Cryptography: Chapter 12, Key Established Protocols," CRC Press, Inc. 1997, 54 pages.
Josang et al., "User Centric Identity Management," AusCERT Conference 2005, 13 pages.
Smith, "Storage Protection with Intel Anti-Theft Technology-Data Protection (Intel AT-d)," Intel Technology Journal vol. 12, Issue 4, Dec. 23, 2008 (18 pages).
United States Patent and Trademark Office, "Non-Final Office Action," issued in connection with U.S. Appl. No. 14/466,447, mailed Nov. 25, 2015 (10 pages).
United States Patent and Trademark Office, "Non-Final Office Action," issued in connection with U.S. Appl. No. 14/508,494, mailed Dec. 14, 2015 (22 pages).
United States Patent and Trademark Office, "Non-Final Office Action," issued in connection with U.S. Appl. No. 13/557,079 mailed Oct. 1, 2015 (15 pages).
European Patent Office, Extended European Search Report, issued in connection with European Patent Application No. 13822709.5, mailed Feb. 16, 2016 (8 pages).

* cited by examiner

METHODS AND APPARATUS TO SECURELY SHARE DATA

FIELD OF THE DISCLOSURE

This disclosure relates generally to computing systems and, more particularly, to methods and apparatus to securely share data.

BACKGROUND

Cloud-based storage services (e.g., such as DropBox, Apple iCloud®, etc.) have become a preferred service for many types of systems and/or organizations.

DETAILED DESCRIPTION

Figure 1:
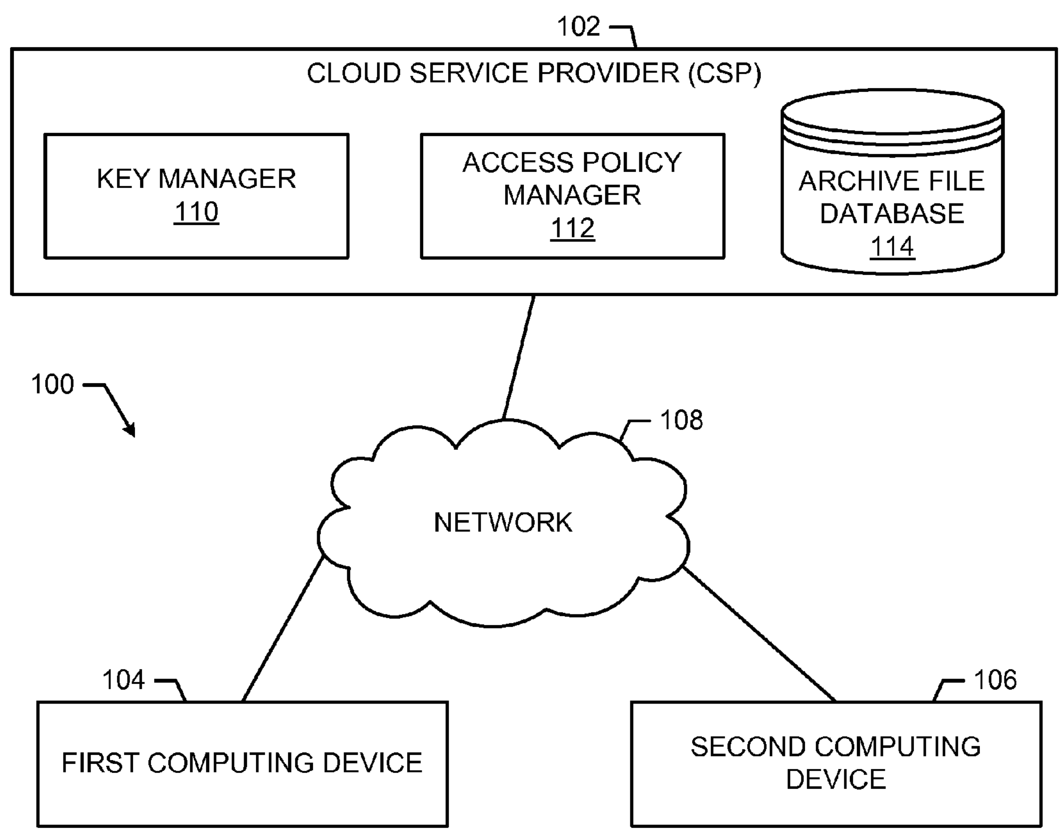
FIG. 1 illustrates an example system including an example cloud service provider (CSP) implementing examples disclosed herein.

The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." (Mell, Peter et al., *The NIST Definition of Cloud Computing*, NIST, September 2011). Cloud service providers (CSPs) provide cloud services via different delivery models including, for example, a Software as a Service (SaaS) model, a Platform as a Service (PaaS) model, and/or an Infrastructure as a Service (IaaS) model, etc., and/or combination(s) thereof. When delivered via the SaaS model, the CSP provides users with access to an application running (e.g., being executed) on hardware (e.g., a server accessible to the user via the Internet) managed by the CSP. In the PaaS model, the CSP provides users with a software development environment in which the users can design, build and/or customize application(s) to be executed on hardware of the CSP. The IaaS model involves the CSP providing basic computing services to the users, such as on-demand data storage that is provisioned in real-time based on current needs. Thus, while cloud computing services can be delivered in a plurality of manners, cloud-based systems typically involve a managed pool of resources (e.g., hardware, software, and/or storage devices) that are shared among a plurality of users.

In some instances, such as IaaS models of cloud services, the corresponding CSP provides data storage capabilities. Such cloud-based storage systems and/or services typically store data in a cleartext form to, for example, facilitate indexing and/or searching of the data. When stored in cleartext form, the data is generally unecrypted and exposed to attack by anyone with Internet access. To protect the cleartext form data, prior cloud-based systems rely on client applications to encrypt the data. In such instances, the data made available via the cloud is encrypted by a client application saving (e.g., facilitating the storage of) the data and/or by some intermediate solution implemented in connection with client applications, such as special file systems dedicated to (e.g., designed specifically for) the encryption of data. Such encryption techniques require changes and/or additional processing in connection with the corresponding operating system (OS) environment(s). That is, prior encryption techniques for cloud-based data storage services involve alteration and/or customization of the OS environment. The alteration and/or customization of the OS environment(s) is burdensome. For example, the encryption techniques of such systems include intercepting data flows to and from the OS (e.g., via driver layering techniques) and applying encryption/decryption methods to the intercepted data flows. Such a system introduces additional processing components and/or algorithms in connection with the OS environment. Moreover, dangerous malware operates in a similar fashion (e.g., by intercepting data flows to and from an OS), making the malware difficult to detect by, for example, anti-virus agents. Accordingly, known systems rely on end users (e.g., customers of the CSP) to actively configure and/or maintain security functionality to protect the cloud-based resources and/or data.

Example methods, apparatus, and articles of manufacture disclosed herein provide security (e.g., encryption and decryption of data) for cloud-based storage systems while remaining OS agnostic. That is, examples disclosed herein provide encrypted cloud-based data storage without impacting (e.g., without imposing compatibility requirements on) the OS environments of, for example, client machines at which the data is generated, stored, and/or accessed. For example, users having accounts on different OS platforms are able to share data via examples disclosed herein. As described in greater detail below, examples disclosed herein generate and encrypt an archive file (e.g., an ISO (International Organization for Standards) image) representative of data stored on a drive (e.g., of a computing device) to be shared via the cloud. In some examples disclosed herein, the encrypted archive file (e.g., an E-ISO image) represents the entire content of the corresponding drive (e.g., an optical drive), thereby providing full disk encryption (FDE) for cloud-based storage systems. In some examples disclosed herein, the encrypted archive file is provisioned with one or more wrapped encryption keys (e.g., Disk Encryption Keys (DEKs)) to enable authorized recipients of the archive file to access the data represented by the archive file. In some examples disclosed herein, the encryption and/or decryption of the archive file and/or the provisioning of the encrypted file with, for example, wrapped DEK(s) is/are performed via a Trusted Execution Environment (TEE) that provides secure communications and secure operations. In some examples disclosed herein, one or more operations provided by the TEE are performed on the computing device(s) that have registered for services provided by the CSP. Additionally or alternatively, one or more operations provided by the TEE are performed on a computing device managed and/or operated by the CSP. That is, examples disclosed herein enable a CSP to act in a capacity of a TEE to, for example, wrap and/or unwrap encryption data over a secure channel and/or to provide the wrapped and/or unwrapped encryption data to, for example, a registered cloud user computing device.

Thus, the fully provisioned, encrypted archive file generated by examples disclosed herein can be shared with (e.g., conveyed to and decrypted by) a computing device being used by a cloud user having an authentic password (e.g., a phrase or string corresponding to the wrapping of the keys). In some examples, the encrypted archive file is decrypted (e.g., by the receiving computing device) and mounted to the OS of the receiving computing device. By mounting the archive file to the OS environment of the computing device (e.g., rather than the OS accessing the data via a physical drive or port), examples disclosed herein provide the computing device with a virtual drive including the data to be shared via the cloud. The virtualization of the drive permits the data of the archive file to be shared with any OS environment without having to alter or customize the OS environment. As such, examples disclosed herein provide interoperability with a broad range of platforms and applications.

While examples disclosed herein are discussed in the context of cloud-based computing and cloud-based storage systems, examples disclosed herein may be implemented in any suitable networked environment, platform, and/or community. For example, peer-to-peer sharing environments may utilize examples disclosed to securely share data over a network.

FIG. 1 illustrates an example computing environment 100 in which examples disclosed herein may be implemented. The example computing environment 100 of FIG. 1 includes an example cloud service provider (CSP) 102 that provides cloud-based service(s) to one or more users (e.g., people and/or organizations registered with the CSP 102). The example computing environment 100 of FIG. 1 includes an example first computing device 104 corresponding to a first user (of one or more services provided by the CSP 102) and an example second computing device 106 corresponding to a second user (of one or more services provided by the CSP 102). The example first and second computing devices 104, 106 of FIG. 1 are any suitable computing devices, such as, for example, a desktop computer, a mobile computing device (e.g., a smart phone, a tablet, a laptop computer), a server, etc. The example first and second computing devices 104, 106 of FIG. 1 are in communication with one or more computing devices (e.g., server(s)) of the CSP 102 via an example network 108. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events. The example network 108 of FIG. 1 may be implemented using any suitable wired and/or wireless network(s) including, for example, one or more data buses, one or more Local Area Networks (LANs), one or more wireless LANs, one or more cellular networks, the Internet, etc. In some examples, the computing environment 100 of FIG. 1 includes additional computing devices and/or CSPs. The example CSP 102 of FIG. 1 provides cloud-based services based on one or more of, for example, the SaaS model, the PaaS model, the IaaS model, etc. In some examples, the CSP 102 of FIG. 1 receives registration requests for service from any suitable member of the general public. In some examples, the CSP 102 of FIG. 1 is limited to providing cloud-based services to a finite group of users, such as employees of a particular company. In some examples, the CSP 102 of FIG. 1 is a hybrid environment available to certain services to (registered) members of the public and/or additional or alternative services to one or more particular groups of people or users.

In the illustrated example of FIG. 1, the CSP 102 implements an example key manager 110, an example access policy manager 112, and an example archive file database 114. The example key manager 110, the example access policy manager 112, and the example archive file database 114 of the example CSP 102 of FIG. 1 cooperate with (e.g., communicate and/or exchange information with) the example first computing device 104 and/or the second computing device 106 to securely share (e.g., provide access to) data of the first computing device 104 and/or the second computing device 104. For purposes of illustration, the following examples discuss the first computing device 104 sharing data stored on and/or generated by the first computing device 104 with the second computing device 106. However, the example second computing device 106 may additionally or alternatively share data stored on and/or generated by the second computing device 106 with the first computing device 104. In the illustrated example, the first and second computing devices 104, 106 are different machines having different OS environments. However, in some examples the first and second computing devices 104, 106 are machines having similar OS environments. As described in detail below, the examples disclosed herein enable the first and second computing device 104, 106 having disparate OS environments to share data via the cloud despite the differences in OS environments and without requiring alteration and/or customized to the respective OS environment of the computing devices 104, 106. Put another way, the example CSP 102 and the example first and second computing devices 104, 016 facilitate secure sharing of data (e.g., data stored locally on the computing devices 104, 106) via one a cloud service provided by the example CSP 102.

In the example of FIG. 1, the first computing device 104 corresponds to (e.g., belongs to and/or is registered to) a first user that has registered with the example CSP 102. The second computing device 104 corresponds to (e.g., belongs to and/or is registered to) a second user that has registered with the example CSP 102. As part of a registration process facilitated via the example CSP 102 of FIG. 1, the first and second users provide identifying information to the CSP 102, such as names, identifiers, passwords, demographic data, information related to capabilities of the computing device 104, 106, and/or any additional or alternative information. The example CSP 102 of FIG. 1 uses the provided information to, for example, register the corresponding user to one or more cloud-based services, such as data storage and/or access privileges to information stored on cloud-based resources (e.g., other client machines and/or centralized data storage). In some examples, registration of the user involves assigning a user name and password to each user such that the user can log on to systems provided by the CSP 102. Thus, in some examples, the users of the cloud are required to enter a user name and password before utilization of the cloud services is allowed. In the illustrated example of FIG. 1, the key manager 110 of the CSP 102 receives at least some of the information provided by the registered users and utilizes, for example, passwords assigned to the users to generate one or more keys for security purposes. For example, the example key manager 110 of FIG. 1 can use a first password provided by the first user associated with the first computing device 104 to generate a first private (e.g., secret, symmetric) encryption key. Additionally, the example key manager 110 of FIG. 1 can use a second password provided by the second user associated with the second computing device 104 to generate a second private encryption key. The example key manager 110 of FIG. 1 conveys the private encryption keys to the respective computing device 104, 106 for storage at the respective computing device 104, 106. Further, the example key manager 110 of FIG. 1 generates a public encryption key for each registered user and facilitates storage of the public encryption keys by the CSP 102. As described in detail below in connection with FIGS. 2 and 3, the example first and second computing devices 104, 106 utilize the encryption keys managed by the example key manager 110 to facilitate encryption and decryption of data shared via the cloud. As the encryption keys are obtained and managed by the CSP 102 (e.g., via the example key manager 110 of FIG. 1 and components of the computing devices described in detail below), the security provided by examples disclosed herein enable cloud-based encryption and/or user-identifying techniques, rather than relying on different, local security mechanisms of the individual computing devices 104, 106. As disclosed in detail below, the example CSP 102 of FIG. 1 may additionally or alternatively provide secure wrapping and/or secure unwrapping services (e.g., via TEE capabilities) in which encryption data is provisioned with key information and/or processed to obtain key information. In some examples, the key information provisioned and/or obtained by the example CSP 102 is communicated via one or more secure channels between the CSP 102 and the first and/or second computing device 104, 106.

When the first user of the first computing device 104 desires to share data associated with the first user (and/or the first computing device 104), the example access policy manager 112 of FIG. 1 receives access instructions from the first computing device 104 that indicate which user(s) of the cloud-based services should have access to and/or privileges to data designated for sharing by the first user (e.g., the owner of the data designated for sharing). For example, if the first user designates data stored at the first computing device 104 for sharing with the second user associated with the second computing device 106, the example access policy manager 112 of FIG. 1 receives an indication from the first computing device 104 that the second user should be granted privileges (e.g., access privileges) to the corresponding data. In the illustrated example of FIG. 1, the sharing or access instructions received by the example access policy manager 112 include one or more identifiers associated with the second user and/or the second computing device 106. Additionally or alternatively, the first user may designate a group of users and/or all registered users of the cloud services for sharing purposes. In such instances, the example access policy manager 112 of FIG. 1 receives one or more identifiers associated with the designated group(s). For purposes of brevity and clarity, the following describes a scenario in which the second computing device 106 is designated as at least one of the devices to have access to the data shared by the first user. The example access policy manager 112 of FIG. 1 uses the sharing or access instructions provided by the first computing device 104 to determine which key information is to be provisioned into the encrypted archive file that represents the data to be shared. That is, the example access policy manager 112 of FIG. 1 selects which public and/or privates keys corresponding to different cloud users (e.g., the second user) are to be included in the encrypted archive file. In some examples, the access policy manager 112 of FIG. 1 utilizes knowledge of the cloud (e.g., a social graph connections between cloud users) to select the public and/or private keys with which to provision the encrypted archive file.

In some examples, the example access policy manager 112 of FIG. 1 forwards the selected (and obtained from the key manager 110) key information to the first computing device 104 such that the first computing device 104 can (e.g., via methods and apparatus disclosed in detail below) facilitate protection (e.g., encryption) and conveyance of the data to be shared with the second user. The example access policy manager 112 of FIG. 1 may forward additional information to accompany the obtained key information such as, for example, instructions regarding use of the security information (e.g., the public encryption key corresponding to the second user). As described below, in some examples, the protection and conveyance of the data involves generation and encryption of an archive file representative of a drive of the first computing device 104. Additionally or alternatively, the example CSP 102 (e.g., via the key manager 110 and/or a trusted execution environment component implemented via the CSP 102) performs the provisioning of the encrypted archive file with the selected key information. That is, the example first computing device 104 may provision the encrypted archive file with key information and/or convey the encrypted archive file to the example CSP 102 for provisioning.

In the illustrated example of FIG. 1, the example CSP 102 receives the encrypted archive file and stores a copy of the encrypted archive file in the archive file database 114. To provide the second user with access to the data shared by the first computing device 104, the encrypted archive file is conveyed to the second computing device 106. In some examples, the archive file is conveyed in response to a request from the second computing device 106. Additionally or alternatively, the archive file is conveyed to the second computing device 106 automatically (e.g., in the absence of a specific request from the second computing device 106). As described in detail below, the example second computing device 106 of FIG. 1 unwraps encryption information (e.g., a DEK) and uses the encryption information to decrypt the archive file (e.g., using the public and private encryption keys assigned to the second user as part of the registration process). Additionally or alternatively, the example CSP 102 of FIG. 1 may perform the unwrapping and/or decryption and may convey the archive file to the second computing device 106 via one or more secure channels. In the illustrated example of FIG. 1, the decrypted archive file is mounted to an OS file system of the second computing device 106, thereby exposing the data of the archive file to the OS file system of the second computing device 106 as a virtual drive. The virtualization of the drive (via the mounting of the archive file to the OS environment) permits the example second computing device 106 with access to the data shared by the first user without compatibility requirements for the OS environment of the second computing device 106, as would be the case in prior systems.

Accordingly, the example of FIG. 1 enables the first and second computing device 104, 106 to securely share data via cloud services provided by the example CSP 102 even when the respective OS environments of the first and second computing device 104, 106 are not compliant with respect to security aspects (e.g., encryption platforms, techniques, configurations, etc.). Further, the examples disclosed in connection with FIG. 1 enable the first and second users to have a cloud-based identity for purposes of encryption and decryption. Put another way, the security data (e.g., public and private encryption keys) are shared via the cloud services provided by the example CSP 102 without requiring the first and second users to have accounts on the same OS platform. Thus, the examples disclosed in FIG. 1 provide interoperability between the first and second computing device 104, 106 (as well as any other devices registered with and/or otherwise utilizing the services provided by the example CSP 102) in spite of differences between the OS environments and/or security configurations of the platforms of the first and second computing devices 104, 106.

Figure 2:
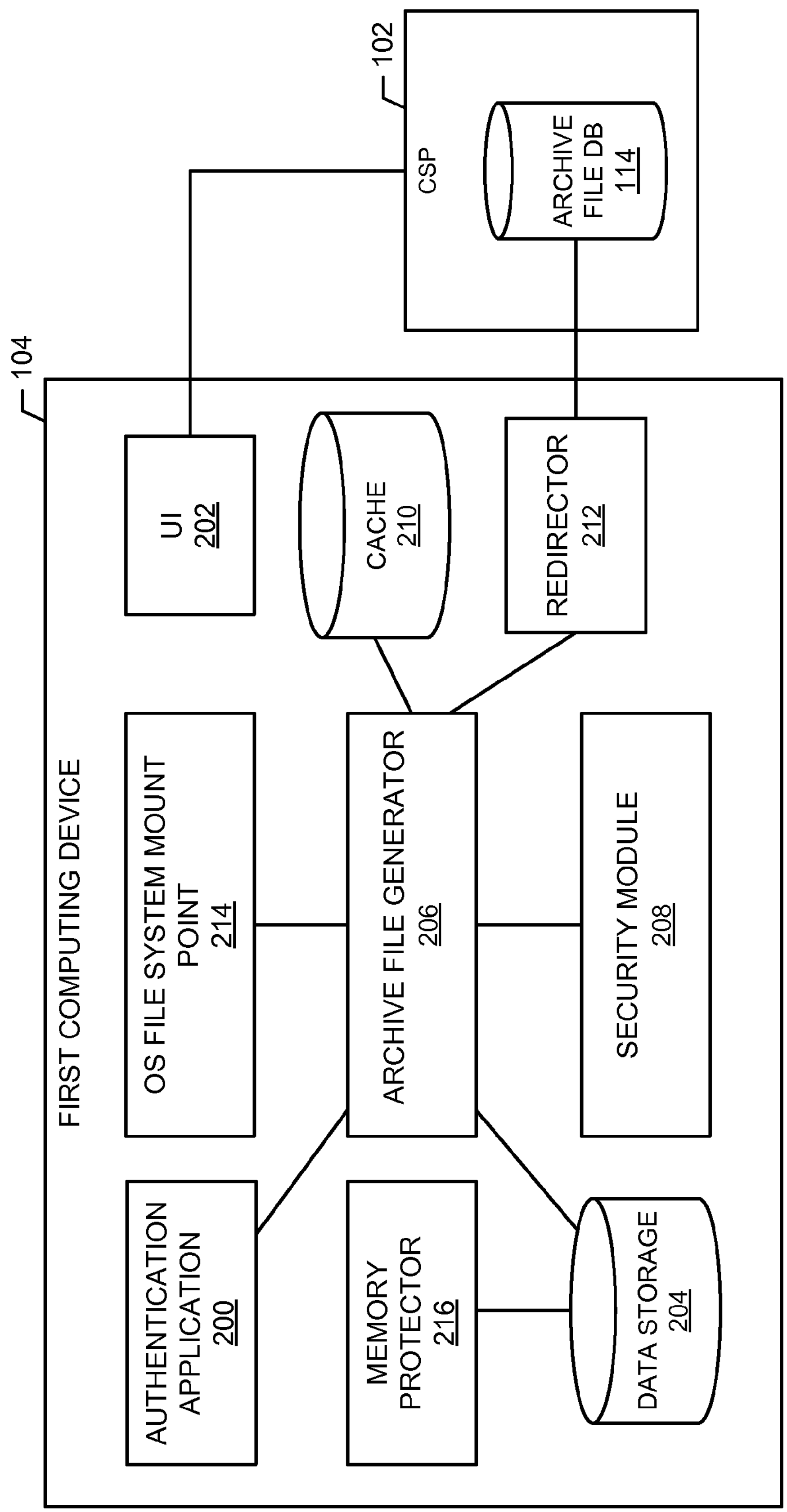
FIG. 2 is a block diagram of an example implementation of the example first computing device of FIG. 1.

FIG. 2 illustrates an example implementation of the example first computing device 104 of FIG. 1 in communication with the example archive file database 114 of the example CSP 102 of FIG. 1. The example of FIG. 2 may additionally or alternatively correspond to an example implementation of the example second computing device 106 of FIG. 1 and/or any other computing device registered with the example CSP 102 of FIG. 1. The example first computing device 104 of FIG. 2 includes an example authentication application 200, an example user interface 202, an example data storage 204, an example archive file generator 206, an example security module 208, an example cache 210, an example redirector 212, and an example OS file system mount point 214. In the illustrated example of FIG. 2, the authentication application verifies an identity of a person using the computing device 104. The example authentication application 200 of FIG. 2 uses any suitable technique and/or information such as, for example, biometric(s), machine password(s), and/or authentication token(s) (e.g., via an Intel® Mirror Pass agent and/or Intel® Protection Technology), pre-boot authentication (PBA) techniques. That is, the example authentication application 200 of FIG. 2 verifies that the user of the computing device 104 is authorized to use the machine. The example authentication application 200 may be, for example, a pre-boot authentication module (PBA), an OS-based application or embedded in a security engine (e.g., Intel Mirror Pass).

In the example of FIG. 2, the user interface 202 is a web browser. However, any suitable user interface may be used on the example computing device 104. The example user interface 202 of FIG. 2 enables the user of the computing device 104 to communicate with the CSP 102 to, for example, register with the CSP 102 and exchange cloud-based sharing information with the CSP 102. For example, the user interface 202 enables the user of the computing device 104 to provide access instructions (e.g., identifier(s) associated with cloud users with which the user of the first computing device 104 wishes to share data) to the CSP 102 and to receive corresponding access data (e.g., public encryption key(s)) from the CSP 102.

The example computing device 104 of FIG. 2 includes data storage 204 to store data that may be shared via, for example, the cloud implemented by the example CSP 102. The example data storage 204 of FIG. 2 is any suitable storage such as, for example, a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). Although shown as a single component in FIG. 2, the example data storage 204 of FIG. 2 may include one or more storage devices, such as disks, drives, etc.

The user of the first computing device 104 may designate data of the data storage 204 to be shared via the cloud services provided by the example CSP 102 with, for example, the second computing device 106 of FIG. 1. In such examples, the user provides (e.g., via the user interface 202) access or privilege instructions to the CSP 102 including an identification of the data to be shared and one or more identifications of user(s) and/or group(s) with which the data is to be shared (e.g., identifying which device(s) and/or user(s) should be granted access to the shared data). In some examples, the CSP 102 responds to the access or privilege instructions with security information (e.g., specific key information corresponding to the user(s) designated for sharing) and instructions to generate an archive file representative of the data of the data storage 204 to be shared. In response to the instructions and/or information provided by the CSP 102, the example archive file generator 206 of FIG. 2 generates such an archive file. In the illustrated example of FIG. 2, the archive file generator 206 generates an ISO image representative of a disk or drive of the data storage 204 including the data to be shared. In the illustrated example, the archive file generator 206 obtains cleartext blocks of data from the data storage 204 and generates the ISO image using the cleartext blocks of data. Further, the example security module 208 of FIG. 2 uses the security information provided by the CSP 102 to encrypt the ISO image generated by the example archive file generator 206. In the illustrated example of FIG. 2, the security module 208 uses a Disk Encryption Key (DEK) to encrypt the ISO image, thereby forming an encrypted ISO (E-ISO) image. Thus, the example security module 208 uses the DEK to transform the cleartext blocks of the ISO image into cipher blocks. Further, in the illustrated example of FIG. 2, the security module 208 uses key data (e.g., the public and/or private encryption keys corresponding to the user(s) to be granted access to the shared data) to wrap the DEK. The example security module of FIG. 2 provisions the E-ISO image with the wrapped DEKs. Example implementations of the security module 208 and encryption of the archive file are discussed below in connection with FIG. 3. In some examples, the E-ISO image is further provisioned with a key of the CSP 102 (e.g., by wrapping a public of the E-ISO with a public wrapping key of the CSP 102) to facilitate secure communication of the E-ISO when, for example, the CSP 102 performs one or more security operations via, for example, a TEE.

In illustrated example of FIG. 2, a copy of the provisioned E-ISO image is stored locally in, for example, the cache 210. Moreover, the example computing device 104 of FIG. 2 forwards the provisioned E-ISO image to the CSP 102, which stores the E-ISO image in the archive file database 114. In some examples, the computing device 104 implements the redirector 212. For example, the computing device 104 may implement the example redirector 212 via Intel® Integrated Development Environment Redirection (IDER). The example redirector 212 enables the computing device 104 to remotely utilize the E-ISO image as stored at the archive file database 114 of the CSP 102. For example, the redirector 212 enables the computing device 104 to boot from the E-ISO image stored in the archive file database 114 to, for example, recover from a corrupted local OS image. The functionality provided by the example redirector 212 of FIG. 2 can also be useful when the example computing device 104 is a diskless workstation because the redirector 212 enables disk I/O operations to be exchanged with the remotely stored E-ISO image. In some examples, the redirector 212 is implemented as part of the security module 208, as described below. Additionally or alternatively, the example redirector 212 may be implemented as part of the archive file generator 206 (e.g., as a driver associated with the archive file generator 206).

The provisioned E-ISO image (which is representative of the data of the data storage 204 to be shared via the cloud) stored at the archive file database 114 can be shared with, for example, computing devices registered with the CSP 102. For example, the computing device 104 of FIG. 2 may request (e.g., via the example user interface 202) and/or may be automatically provided with an E-ISO image representative of data shared by another cloud user (e.g., the second user associated with the second computing device 106 of FIG. 1). In some examples, the example security module 208 receives the E-ISO and the wrapped DEK(s) provisioned in the E-ISO. That is, the example security module 208 receives cipher blocks provisioned with wrapped DEK(s). The example security module 208 of FIG. 2 unwraps the DEK(s) (e.g., using the private key(s) assigned to the corresponding user(s)). As disclosed above, the example CSP 102 may alternatively perform the unwrapping of the DEK(s) and provide the unwrapped DEK(s) to the corresponding computing device(s) (e.g., the second computing device 106) via one or more secure channels. In the illustrated example, the security module 208 uses the unwrapped DEK(s) to decrypt the E-ISO, thereby providing the computing device 104 with a decrypted ISO image. In the illustrated example of FIG. 2, the decrypted ISO image is mounted to a file system of the operating system of the computing device 104 via the example OS file system mount point 214. As a mounted archive file, the example ISO image provided by the CSP 102 is exposed to the OS of the computing device 104 as a virtual drive having the data shared via the cloud. That is, the example OS file system mount point 214 provides the example computing device 104 with a virtualized version of the shared data. In some examples, mounting the ISO image involves a remote computing platform (e.g., Intel Active Management Technology (AMT)) exposing the virtual drive and access to (e.g., write operations) the virtual drive is handled by embedded crypto-engines of the remote computing platform such as, for example, a Self-Encrypting Drive (SED), a hardware security module (HSM), a crypto acceleration function (e.g., via an instruction set such as Intel® AES-NI). In such instances, cipher blocks are redirected via the remote computing platform to and/or from the first computing device 104 and the CSP 102. In some examples, the redirection of the cipher blocks includes modifications to the remote computing platform to recognize one or more corresponding remote file storage protocols (e.g., Internet Small Computer System Interface (iSCSI) protocol(s)).

The example first computing device 104 of FIG. 2 includes an example memory protector 216. The example memory protector 216 provides security to sensitive data, such as DEK(s) and/or ISO image(s) stored on, for example, persistent memory (e.g., flash, RAM, PRAM (persistent RAM), etc.) of the first computing device 104. The example memory protector 216 is described in detail below in connection with FIG. 4.

Figure 3:
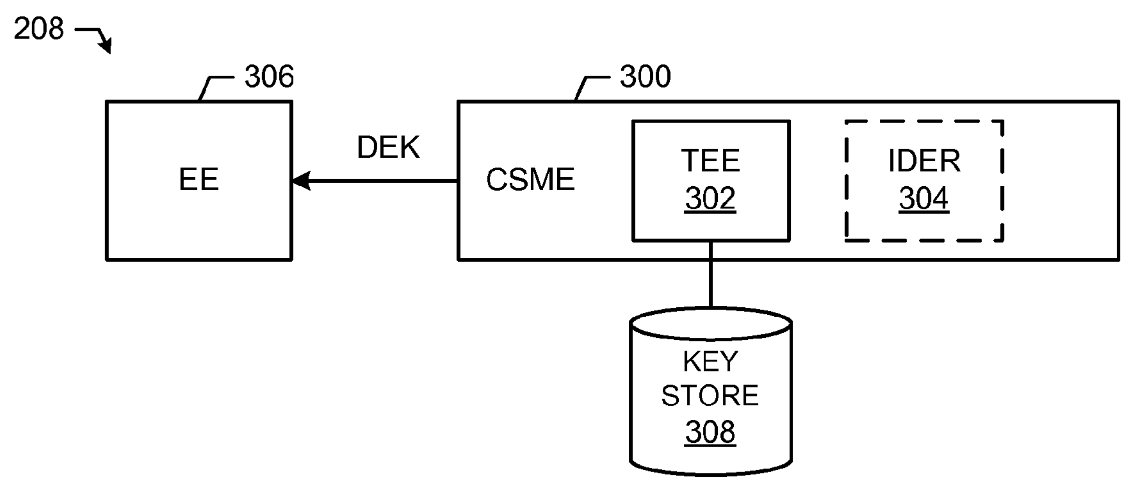
FIG. 3 is a block diagram of an example implementation of the example security module of FIG. 2.

FIG. 3 illustrates an example implementation of the example security module 208 of FIG. 2. The example of FIG. 3 includes an Intel® Security and Manageability Engine (CSME) 300, which implements an example Trusted Execution Environment (TEE) 302. Additionally, the example CSME 300 of FIG. 3 implements an example IDER 304, which provides functionality similar to the redirector 212 of FIG. 2. That is, the redirector 212 of FIG. 2 may be additionally or alternatively implemented in connection with the CSME 300 of FIG. 3. The example CSME 300 of FIG. 3 is in communication with an example Encryption Engine (EE) 306. The example EE 306 of FIG. 3 performs one or more of the encryption and decryption functions disclosed above in connection with FIGS. 1 and 2. For example, when the computing device 104 is in the process of sharing data, the EE 306 receives cleartext data blocks of the ISO image and encrypts the cleartext blocks into ciphertext blocks (e.g., using one or more DEKs. Additionally, when the computing device 104 is in the process of accessing shared data (e.g., from another computing device of the cloud), the EE 306 of FIG. 3 receives ciphertext blocks of an E-ISO image and decrypts the ciphertext blocks into cleartext blocks, which can be accessed and understood by the OS environment of the computing device 104. The example CSME 300 of FIG. 3 supports storage of symmetric and/or asymmetric keys such as the DEK(s) used to encrypt/decrypt data blocks. In the illustrated example of FIG. 3, the CSME 300 is in communication with an example key store 308 to facilitate storage of the keys. In the example of FIG. 3, the TEE 302 uses the public keys of the key store 308 to, for example, wrap the DEKs for secure use by another user over the cloud. Further, the example TEE 302 of FIG. 3 uses the private keys of the key store 308 to, for example, unwrap the wrapped DEKs. In the illustrated example, the unwrapped DEKs are conveyed to the EE 306 for use in decrypting the corresponding E-ISO image. The example CSME 300 of FIG. 3 also performs key management and access operations including, for example, processing (e.g., interpretation of) access policies received from the CSP 102, comparison of user authentication information to reference data (e.g., in connection with an authentication of a user), etc.

The example security module 208 of FIG. 3 may be implemented in additional or alternative manner(s) and/or via additional or alternative platform(s). For example, the example EE 306 may be implemented in a CPU package using a CPU instruction set (e.g., Intel® AES-NI) designed to accelerate encryption and/or instructions designed for code isolation (e.g., Intel® Software Guard Extensions (SGX). Additionally or alternatively, the example EE 306 may be implemented in a chipset in which a crypto offload engine encrypts and decrypts a data stream (e.g., a data storage I/O stream) transparently to the OS file system. In such examples, the CSME 300 may be implemented in the chipset to perform key exchange operations and to coordinate access to DEKs (e.g., by wrapping and unwrapping the DEKs. Additionally or alternatively, the example EE 306 may be implemented in a Self Encrypting Drive (SED) in which an embedded block encrypter is tasked (or re-tasked) to perform encryption and/or decryption, and in which storage and retrieval of the data blocks are reflected to an E-ISO driver for read/write processing with an ISO image. Additionally or alternatively, the example EE 306 of FIG. 3 may be implemented in a peripheral Hardware Security Module (HSM) in which data block encryption and/or decryption are performed and reflected back to the E-ISO driver. The example computing device 104 of FIGS. 1 and/or 2 may implement the example EE 306 in one or more of the examples disclosed above. That is, the example security module 208 may utilize a single implementation of the example EE 306 described above or any suitable combination of the implementations of the example EE 306 described above.

Figure 4:
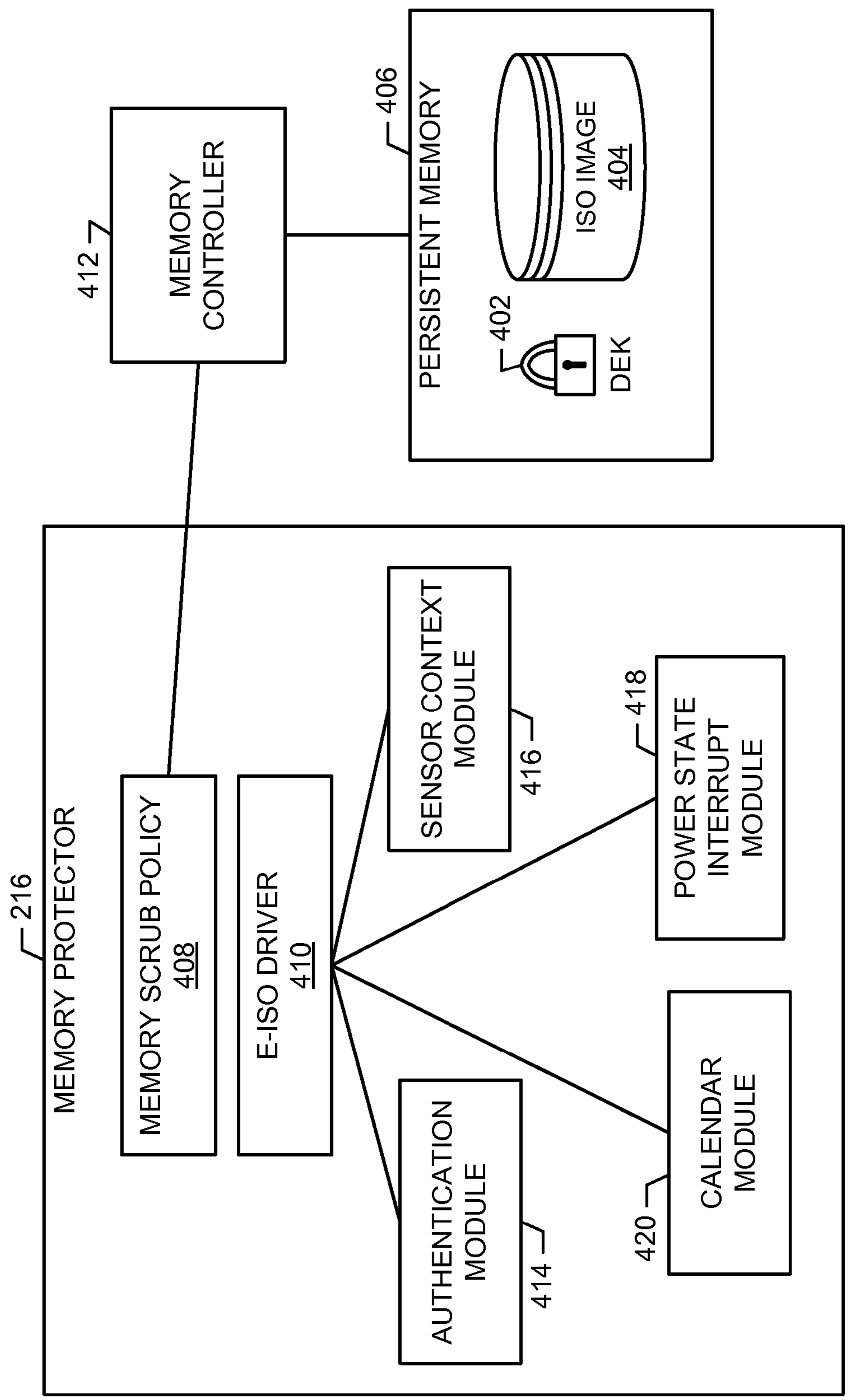
FIG. 4 is a block diagram of an example implementation of the example memory protector of FIG. 2.

FIG. 4 illustrates an example implementation of the memory protector 216 of FIG. 2. The example memory protector 216 of FIG. 4 provides security to sensitive data, such as the DEK(s) 402 and/or the ISO image(s) 404 (e.g., ISO images) disclosed herein when such information is stored on, for example, persistent memory 406 (e.g., RAM) of the corresponding device. Storage of the DEK(s) 402 and/or the archive file(s) 404 on the persistent memory 406 presents a challenge because the data may be in the clear while in use. If the machine including the persistent memory 406 was accessed in an unauthorized fashion (e.g., stolen), the unauthorized user could, in theory, obtain access to cleartext of the ISO image(s) 404 via, for example, physical probing of the persistent memory 406 and/or by re-applying power to a host CPU and exploiting a software bug in a kernel or an application mode. The example memory protector 216 of FIG. 4 protect against such attacks. In the illustrated example of FIG. 4, the memory protector 216 implements a memory scrub policy 408 in, for example, a driver 410 associated with generation of the E-ISO images disclosed herein. For example, the driver 410 of FIG. 4 is implemented by the example archive file generator 206 of FIG. 2. In response to one or more indications of an attack or impropriety, the example memory scrub policy 408 generates a command for a memory controller 412 that manages the persistent memory 406. That is, the example memory scrub policy 408 defines one or more scenarios in which the command is provided to the memory controller 412. In the illustrated example, the command provided by the example memory protector 216 per the memory scrub policy 408 instructs the memory controller 412 to scrub, erase, and/or delete portion(s) of the persistent memory 406 including sensitive information such as, for example, the DEK(s) 402 and/or the ISO image(s) 404. In some examples, the memory controller 412 utilizes one bit of a page table entry as an indication of the corresponding page including secrets-in-memory (SIM). In the illustrated example of FIG. 4, the E-ISO driver 410 sets the SIM bit when appropriate to indicate that a corresponding page in the persistent memory 406 includes SIM.

The example memory protector 216 of FIG. 4 receives data from one or more modules that detect a high-risk scenario and/or event indicative of, for example, an attack on the persistent memory 406. In the illustrated example, the modules that provide attack detection data include an example user identification module 414, an example sensor context module 416, an example power state interrupt module 418 and an example calendar module 420. The example user identification module 414 of FIG. 4 determines whether (e.g., within a threshold likelihood) the computing device is being used by an authorized user and/or whether an unauthorized user is attempting to access the host machine. In the illustrated example of FIG. 4, the user identification module 414 of FIG. 4 utilizes the example authentication module 200 of FIG. 2 to determine whether the user is authentic (e.g., by determining whether a log in process was successfully navigated and/or bypassed). If the current user is not recognized and/or authentic, the example authentication module 414 conveys an indication to the example E-ISO driver 410. In some examples, the memory scrub policy 408 of FIG. 4 is referenced to determine whether a scrub command is to be conveyed to the memory controller 412 in response to the indication from the authentication module 414.

The example sensor context module 416 of FIG. 4 detects a context of the host machine such as, for example, a lid status (e.g., open, closed, opening or closing), a user presence near the host machine, a lack of user presence near the host machine, a non-use context (e.g., by comparing motion information from an accelerometer and/or a gyroscope to reference motion information to detect an activity not associated with productivity or use, such as walking or other motion not typical for user productivity). If the host machine is determined to be in a state of non-use, the example sensor context module 416 conveys a corresponding indication to the example E-ISO driver 410. In some examples, the memory scrub policy 408 of FIG. 4 is referenced to determine whether a scrub command is to be conveyed to the memory controller 412 in response to the indication from the sensor context module 416.

The example power state interrupt module 416 of FIG. 4 determines whether unusual interruptions of power indicative of an attack have occurred. If so, the example power state interrupt module 418 conveys a corresponding indication to the example E-ISO driver 410. In some examples, the memory scrub policy 408 of FIG. 4 is referenced to determine whether a scrub command is to be conveyed to the memory controller 412 in response to the indication from the power state interrupt module 418.

The example calendar module 420 of FIG. 4 determines whether the user of the host machine is scheduled or expected to travel and/or be away from work at a particular time or day by, for example, referencing an electronic calendar of the user, such as a calendar implemented by a computer program. During such times, the example calendar module 420 of FIG. 4 informs the memory protector 216 of the expected absence of the user. In some examples, definitions of the example memory scrub policy 408 use such indications to determine whether a scrub command is to be conveyed to the memory controller 412 in conjunction with, for example, one or more additional indications from the authentication module 414, the sensor context module 416, and/or the power state interrupt module 418.

Figure 5:
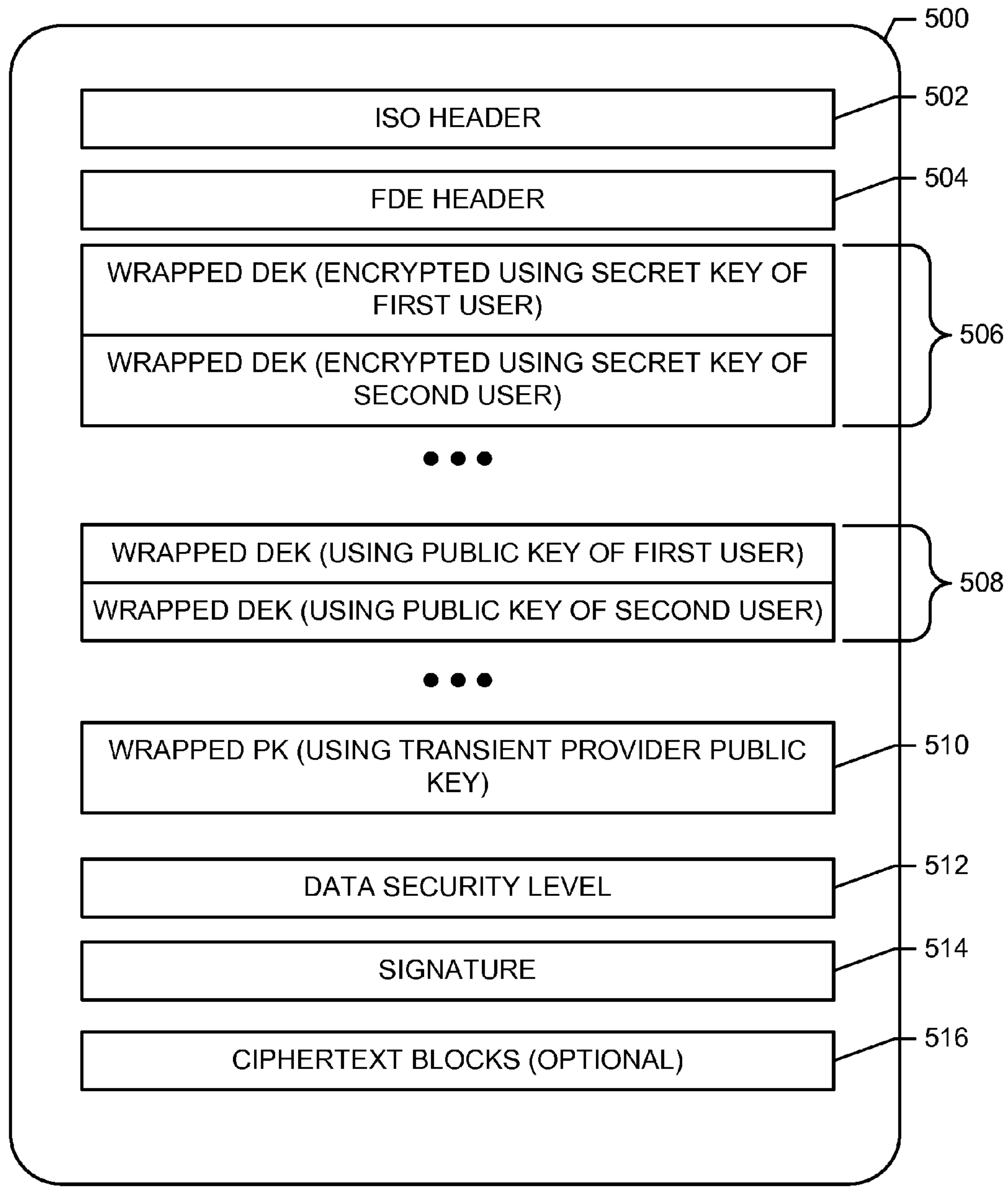
FIG. 5 is an example archive file generated by the example archive file generator of FIG. 2.

FIG. 5 illustrates an example structure of the E-ISO image discussed above in connection with FIGS. 1-3. The example E-ISO image 500 of FIG. 5 includes a header block 502 that satisfies OS mount point requirements for exposing the ISO image to an OS and/or corresponding applications. The example E-ISO image 500 of FIG. 5 includes an FDE (Full Disk Encryption) header 504 that defines offsets into the ISO image to support access (e.g., driver access) to E-ISO specific contents. In the illustrated example, the FDE header information complies with ISO enveloping conventions so as to preserve compatibility with non-EISO-aware drivers. The example E-ISO image 500 of FIG. 5 includes one or more wrapped DEKs 506 encrypted using a private key derived or generated using information collected from, for example, authentication procedures. The example E-ISO image 500 of FIG. 5 includes one or more wrapped DEKs 508 encrypted using a public key such that the owner of the private key corresponding to the public key may decrypt the DEK. The example E-ISO image 500 of FIG. 5 includes one or more wrapped public keys 510 corresponding to the users. In some examples, a transient cryptographic service provider may be employed for cloud-based crypt offload functionality. An example transient cryptographic service provider is disclosed in U.S. Pat. No. 8,422,678, filed Nov. 16, 2005. The example E-ISO image 500 of FIG. 5 includes a data security level 512 that defines a data sensitivity level including, for example, a minimum strength authentication expressed in terms of factors that may be used to authenticate the user. In some examples, the data security level 512 provides information for mapping data sensitivities between the cloud services provided by the CSP 102 and the OS environment (e.g., the OS mount point) of the computing device. The example E-ISO image 500 of FIG. 5 includes a signature 514 to preserve referential integrity of the E-ISO image. In such instances, the signature 514 includes a reference (e.g., a hash of the data blocks, an integrity register initialization vector, or a checksum of blocks such as that provided by a RAID array) to the data blocks to which the headers 502, 504 apply. In some examples, the integrity check values may be used in connection with an I/O session associated with the blocks of the E-ISO to detect MITM (man-in-the-middle) attacks on data block read/write operations exchanged between the computing device 104 and the CSP 102. The example E-ISO image 500 of FIG. 5 includes ciphertext blocks 516. However, in some instances, the ciphertext blocks are stored at the CSP 102 and retrieved when the ISO image is accessed.

Figure 6:
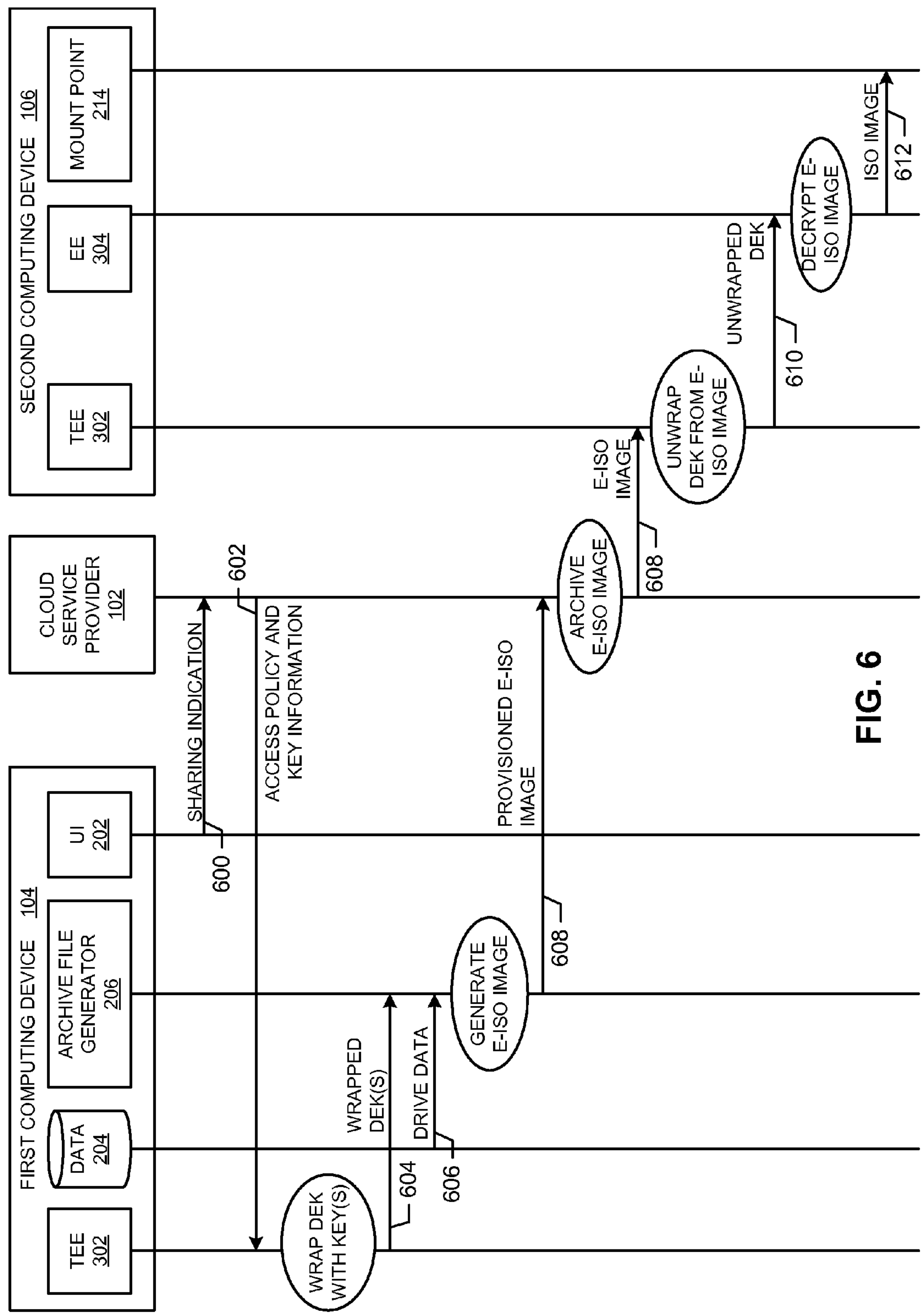
FIG. 6 is a sequence diagram flowchart representative of example communications between the example first computing device of FIGS. 1-4, the example cloud service provider (CSP) of FIGS. 1-2, and the example second computing device of FIG. 1.

FIG. 6 is an example sequence diagram associated with the example CSP 102, the example first computing device 104 and the example second computing device 106 of FIGS. 1-3. In the example of FIG. 6, certain components of the first and second computing devices 104, 106 are shown. However, the first and second computing devices 104, 106 may include additional or alternative components. For example, the example sequence of FIG. 6 corresponds to the first computing device 104 sharing data of the data storage 204 of the first computing device 104 with the second computing device 106 via the cloud services provided by the CSP 102. Therefore, components of the first computing device 104 involved in the encryption and sharing processes are shown in FIG. 6. Conversely, components of the second computing device 106 involved in the decryption and access processes are shown in FIG. 6. However, the example first computing device 104 of FIGS. 1-3 and the example second computing device 106 of FIGS. 1-3 are each separately capable of sharing and accessing data via the cloud services provided by the example CSP 102.

The example of FIG. 6 begins with the first user of the first computing device 104 providing a sharing indication 600 to the CSP 102. The example sharing indication 600 of FIG. 6 is, for example, data conveyed via an HTTP (Hyper Text Transfer Protocol) request generating by the example user interface 202 (e.g., a web browser). The example sharing indication 600 of FIG. 6 indicates that the first user wishes to make data associated with (e.g., stored in the local data storage 204 of) the first computing device 104 available to one or more other cloud users. In the illustrated example of FIG. 6, the sharing indication 600 includes an identifier corresponding to the second user of the second computing device 106 to identify the second user as an intended sharing target of the example first computing device 104.

In response to the example sharing indication 600 of FIG. 6, the example CSP 102 conveys a sharing data package 602 including access policy information and key information to the example TEE 302 of the first computing device 104. In the example of FIG. 6, the key information of the sharing data package 602 provided by the CSP 102 is maintained by the example key manager 110 of the CSP 102 and includes, for example, a public encryption key corresponding to the second user. The example sharing data package 602 of FIG. 6 may include additional or alternative information such as, for example, additional public key(s) corresponding to additional cloud user(s).

In the illustrated example of FIG. 6, the TEE 302 of the first computing device 104 wraps a Disk Encryption Key (DEK) with, for example, the public encryption key(s) of the example sharing data package 602 (e.g., the public encryption key corresponding to the second user. That is, the example TEE 302 generates one or more wrapped DEKs 604, which are conveyed to the example archive file generator 206 of the example first computing device 104. Further, data 606 to be shared via the cloud is obtained and/or accessed by the example archive file generator 206. In some examples, the data 606 includes an entirety of, for example, a drive (e.g., an optical drive) of the first computing device 104. In the example of FIG. 6, the example archive file generator 206 generates an ISO image representative of the drive data 606 and encrypts the ISO image to form an E-ISO image 608. Alternative types of archive files may be utilized to represent the drive data 606. Additionally, the example archive file generator 206 of FIG. 1 provisions the E-ISO 608 with the wrapped DEK(s) 604, thereby generating a provisioned E-ISO image 608. Accordingly, the example archive file generator 206 facilitates generation of an E-ISO image that includes some or all of the data of the drive of the example data storage 204, as well as the wrapped DEK (and any other wrapped DEK(s) corresponding to other users designated to have access to the shared data via the cloud). The example first computing device 104 of FIG. 1 forwards the provisioned E-ISO image 608 to the example CSP 102.

In the example of FIG. 6, the CSP 102 receives the provisioned E-ISO image 608 and stores (e.g., archives) a copy of the E-ISO image 608 in the archive file database 114. In the example of FIG. 6, the CSP 102 forwards the E-ISO image to the second computing device 106 (and/or other user(s) designated for sharing) without receiving a request from the second computing device 106. Alternatively, the example CSP 102 may convey the E-ISO image 608 in response to receiving a request for the second computing device 106. In the example of FIG. 6, the TEE 302 of the second computing device 106 unwraps the wrapped DEK(s) provisioned into the E-ISO image 608. To unwrap the wrapped DEK(s), the example TEE 302 uses the private encryption key assigned to the second user associated with the second computing device 106. For example, the private encryption key may be assigned by the CSP 102 to the second computing device 106 when the second computing device 106 (or a user thereof) registers with the CSP 102. Alternatively, the example CSP may unwrap the DEK(s) (e.g., via TEE functionality) and provide the unwrapped DEK to the second computing device 106 via secure channel(s). With access to the unwrapped DEK(s) 610, the EE 304 of the example second computing device 106 decrypts the E-ISO image 608 to obtain the ISO image 612 representative of the shared drive of the data storage 204 of the first computing device 104. The ISO image 612 is mounted to the OS of the example second computing device 106 via the example mount point 214, thereby providing the OS of the second computing device 106 with a virtualized version of the shared drive data. Accordingly, the example second computing device 106 gains access to the drive data 204 shared by the example first computing device 104 via the sharing services provided by the example CSP 102.

While an example manner of implementing the CSP 102 is illustrated in FIG. 1, one or more of the elements, processes and/or devices illustrated in FIG. 1 may be combined, divided, re-arranged, omitted, eliminated and/or implemented in any other way. While an example manner of implementing the first and/or second computing devices 104, 106 of FIG. 1 is illustrated in FIG. 2, one or more of the elements, processes and/or devices illustrated in FIG. 2 may be combined, divided, re-arranged, omitted, eliminated and/or implemented in any other way. While an example manner of implementing the security module 208 of FIG. 2 is illustrated in FIG. 3, one or more of the elements, processes and/or devices illustrated in FIG. 3 may be combined, divided, re-arranged, omitted, eliminated and/or implemented in any other way. While an example manner of implementing the memory protector 216 of FIG. 4 is illustrated in FIG. 4, one or more of the elements, processes and/or devices illustrated in FIG. 4 may be combined, divided, re-arranged, omitted, eliminated and/or implemented in any other way. Further, the example key manager 110 of FIG. 1, the example access policy manager 112 of FIG. 1, the example authentication application 200 of FIG. 2, the example user interface 202 of FIG. 2, the example archive file generator 206 of FIG. 2, the example security module 208 of FIG. 2, the example redirector 212 of FIG. 2, the example OS file system mount point 214 of FIG. 2, the example CSME 300 of FIG. 3, the example TEE of FIG. 3, the example IDER 304 of FIG. 3, the example EE 306 of FIG. 3, the example memory protector 216 of FIG. 4, the example E-ISO driver 410 of FIG. 4, the example memory controller 412 of FIG. 4, the example authentication module 414 of FIG. 4, the example sensor context module 416 of FIG. 4, the example power state interrupt module 418 of FIG. 4, the example calendar module 420 of FIG. 4 and/or, more generally, the example CSP 102 of FIGS. 1 and/or 2, the example computing devices 104, 106 of FIGS. 1 and/or 2, and/or the example security module 208 of FIGS. 2 and/or 3 may be implemented by hardware, software, firmware and/or any combination of hardware, software and/or firmware. Thus, for example, any of, the example key manager 110 of FIG. 1, the example access policy manager 112 of FIG. 1, the example authentication application 200 of FIG. 2, the example user interface 202 of FIG. 2, the example archive file generator 206 of FIG. 2, the example security module 208 of FIG. 2, the example redirector 212 of FIG. 2, the example OS file system mount point 214 of FIG. 2, the example CSME 300 of FIG. 3, the example TEE of FIG. 3, the example IDER 304 of FIG. 3, the example EE 306 of FIG. 3, the example memory protector 216 of FIG. 4, the example E-ISO driver 410 of FIG. 4, the example memory controller 412 of FIG. 4, the example authentication module 414 of FIG. 4, the example sensor context module 416 of FIG. 4, the example power state interrupt module 418 of FIG. 4, the example calendar module 420 of FIG. 4 and/or, more generally, the example CSP 102 of FIGS. 1 and/or 2, the example computing devices 104, 106 of FIGS. 1 and/or 2, and/or the example security module 208 of FIGS. 2 and/or 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of, the example key manager 110 of FIG. 1, the example access policy manager 112 of FIG. 1, the example authentication application 200 of FIG. 2, the example user interface 202 of FIG. 2, the example archive file generator 206 of FIG. 2, the example security module 208 of FIG. 2, the example redirector 212 of FIG. 2, the example OS file system mount point 214 of FIG. 2, the example CSME 300 of FIG. 3, the example TEE of FIG. 3, the example IDER 304 of FIG. 3, the example EE 306 of FIG. 3, the example memory protector 216 of FIG. 4, the example E-ISO driver 410 of FIG. 4, the example memory controller 412 of FIG. 4, the example authentication module 414 of FIG. 4, the example sensor context module 416 of FIG. 4, the example power state interrupt module 418 of FIG. 4, the example calendar module 420 of FIG. 4 and/or, more generally, the example CSP 102 of FIGS. 1 and/or 2, the example computing devices 104, 106 of FIGS. 1 and/or 2, and/or the example security module 208 of FIGS. 2 and/or 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example CSP 102 of FIG. 1, the example first computing device 104 of FIG. 1, the example second computing device 106 of FIG. 1, and/or the example security module 208 of FIG. 2 may include one or more elements, processes and/or devices in addition to, or instead of, those illustrated in FIGS. 2 and/or 3, and/or may include more than one of any or all of the illustrated elements, processes and devices.

Figure 7:
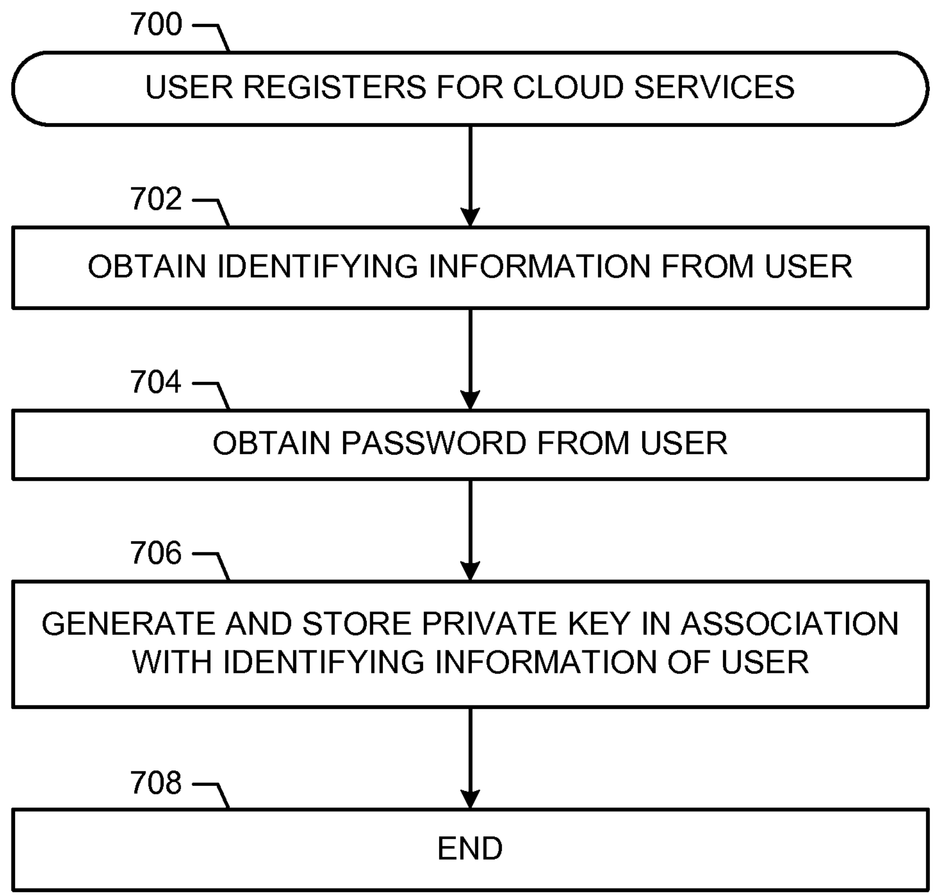
FIG. 7 is a flowchart representative of first example machine-readable instructions that may be executed to implement the example CSP of FIGS. 1-2.
Figure 8:
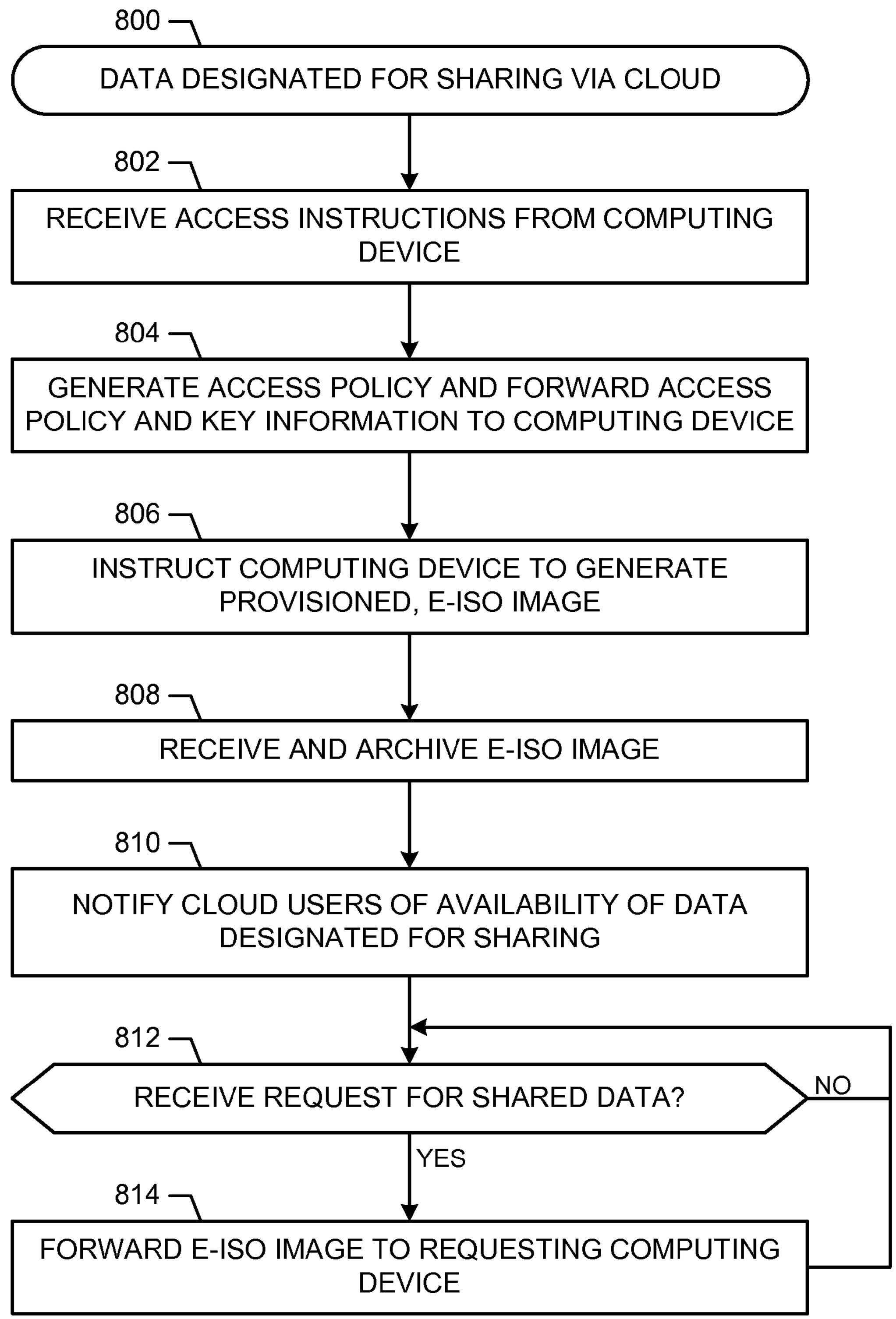
FIG. 8 is a flowchart representative of second example machine-readable instructions that may be executed to implement the example CSP of FIGS. 1-2.
Figure 9:
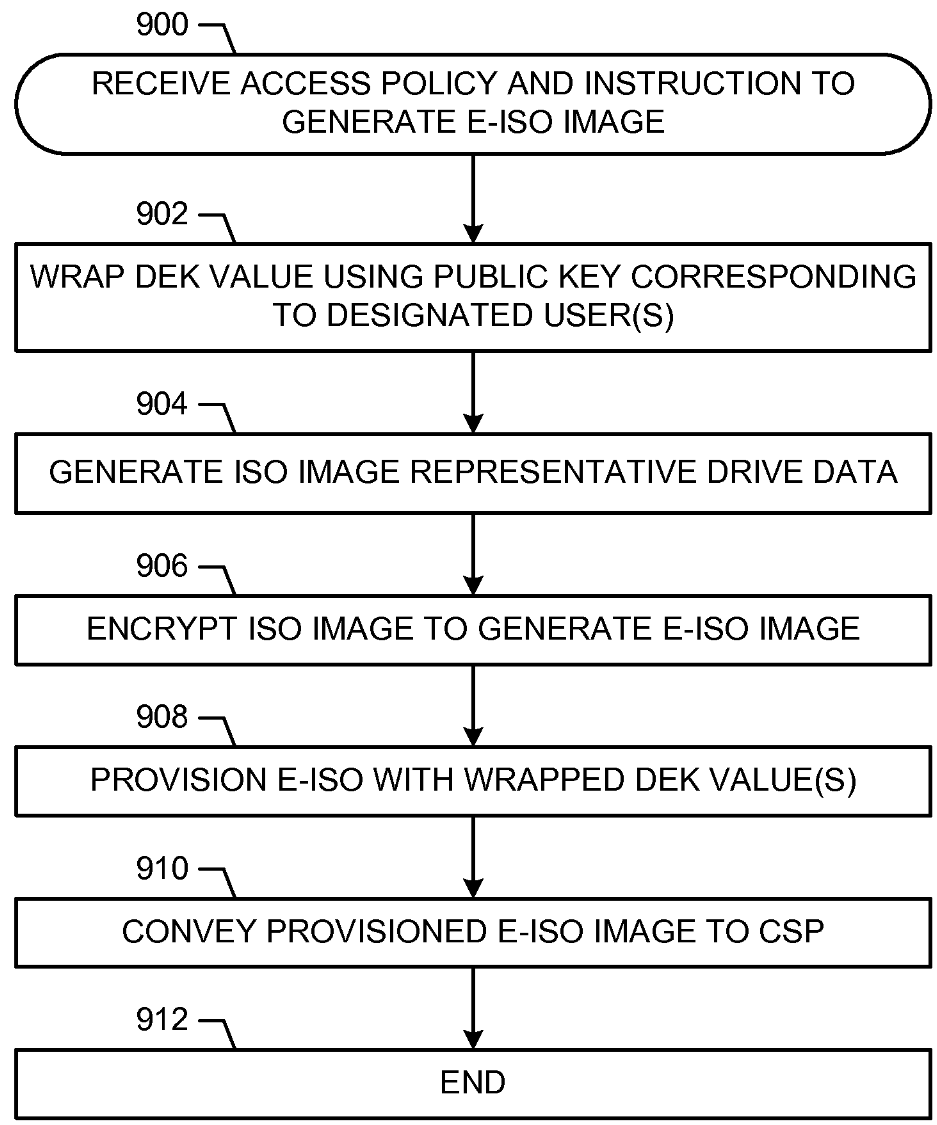
FIG. 9 is a flowchart representative of first example machine-readable instructions that may be executed to implement the example first computing device of FIGS. 1-4 and/or the example second computing device of FIG. 1.
Figure 10:
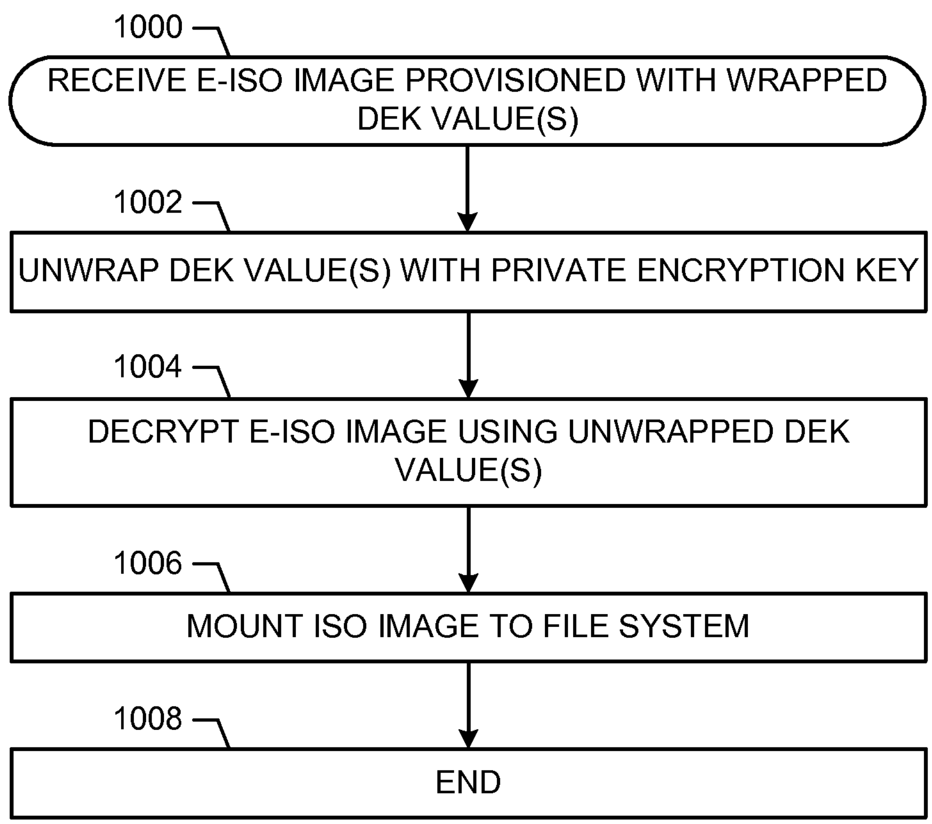
FIG. 10 is a flowchart representative of second example machine-readable instructions that may be executed to implement the example first computing device of FIGS. 1-4 and/or the example second computing device of FIG. 1.

FIG. 7 is a flowchart representative of example machine readable instructions for implementing the example CPS 102 represented in FIGS. 1 and/or 2. FIG. 8 is a flowchart representative of example machine readable instructions for implementing the example CPS 102 represented if FIGS. 1 and/or 2. FIG. 9 is a flowchart representative of example machine readable instructions for implementing the example first computing device 104 represented in FIGS. 1, 2 and/or 3 and/or for implementing the example second computing device 106 represented in FIGS. 1, 2 and/or 3. FIG. 10 is a flowchart representative of example machine readable instructions for implementing the example first computing device 104 represented in FIGS. 1, 2 and/or 3 and/or for implementing the example second computing device 106 represented in FIGS. 1, 2 and/or 3. In these examples, the machine readable instructions comprise programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowchart illustrated in FIGS. 7-10, many other methods of implementing the example CSP 102 of FIGS. 1 and/or 2 and/or the example first and/or second meters 104, 106 of FIGS. 1, 2 and/or 3 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 7 begins with a user registering with data sharing services provided by the example CSP 102 of FIG. 1 (block 700). In the example of FIG. 7, the user registering with the CSP 102 is the first user associated with the first computing device 104 of FIGS. 1-4. In the illustrated example of FIG. 7, the CSP 102 obtains identifying information from the first user such as, for example, a user name, a user-selected identifier, etc. (block 702). In the illustrated example of FIG. 7, the CSP 102 obtains a password from the first user (block 704). In some examples, the password is required to meet one or more security thresholds (e.g., length, difference between previous passwords, different types of characters, etc.). The example key manager 110 uses the user-identifying information and/or the obtained password to generate a private encryption key for the first user (block 706). The example key manager 110 uses any suitable encryption technique and/or algorithm to generate the private encryption key, which is unique to the registering user. The example key manager 110 facilitates storage of the private encryption key at, for example, a database associated with the CSP 102. Additionally or alternatively, the example key manager 110 conveys the private encryption key to one or more devices associated with the registering user (e.g., the first computing device 104). The example of FIG. 7 then ends (block 708).

FIG. 8 corresponds to the first computing device 104 of FIGS. 1-3 designating data (e.g., data stored on the first computing device 104) for sharing via services provided by the example CSP 102 of FIG. 1 (block 800). For example, the first user of the first computing device 104 may utilize the user interface 202 to select data (e.g., a drive of the computing device 104) for sharing with, for example, one or more users, groups, clouds, etc. In the example of FIG. 8, the first user communicates desired aspects of the sharing, such as which other user(s) of the cloud are to have access to the shared data, via the user interface 202 of the first computing device (block 802). In some examples, the access instructions provided by the first computing device 104 include additional or alternative information regarding access to the designated data such as, for example, a period of time for which the data is to be made available via the cloud. In the example of FIG. 8, the access policy manager 112 interprets the access instructions provided by the first computing device 104 and generates an access policy according to, for example, the implementation and/or configuration of the cloud sharing system facilitated by the CSP 102 (block 804). Further, the example key manager 110 provides the appropriate key information (e.g., the public encryption key(s) corresponding to the user(s) with which the data is to be shared), which is conveyed with the access policy to the first computing device 104 (block 804). In the illustrated example of FIG. 8, the access policy provided to the first computing device 104 embodies and/or includes an instruction to the first computing device 104 to generate an archive file representative of the data to be shared (block 806). The instruction to generate the archive file can be of any suitable format using any suitable communication technique.

When the first computing device 104 generates the archive file (as disclosed below in connection with FIG. 9), the CSP 102 receives, for example, an encrypted archive file from the first computing device 104 (block 808). In the illustrated example of FIG. 8, the received encrypted archive file is an encrypted ISO (E-ISO) image that has been provisioned with wrapped DEKs to securely communicate the data of the ISO image. In the example of FIG. 8, a copy of the provisioned E-ISO image is stored in the archive file database 114 (block 808). The example CSP 102 (e.g., via the access policy manager 112) notifies one or more cloud user(s) and/or device(s) (e.g., the second computing device 106) that the data shared by the first computing device 104 is available (block 810). In response to receiving a request for the shared data (block 812), the example CSP 102 conveys the corresponding E-ISO image to a device (e.g., the second computing device 106) of the requester (e.g., the second computing device 106).

FIG. 9 begins with the example first computing device 104 of FIGS. 1-4 receiving an access policy and an instruction to generate an E-ISO image from the CSP 102 (block 900). For example, the instruction received by the first computing device 104 may correspond to block 806 of FIG. 8. As described above, the example access policy conveyed to the first computing device 104 includes and/or is accompanied by encryption key information corresponding to, for example, users with which the data is to be shared. In the illustrated example of FIG. 9, the encryption key information includes a public key corresponding to the user(s) with which the data is to be shared. The example TEE 302 of the first computing device 104 uses the encryption key information to wrap DEK(s) (block 902). Further, the example archive file generator 206 of FIG. 2 generates an ISO image (or any other suitable type of archive file) representative of the data to be shared (e.g., the entire content of the drive including the data) (block 904). In the example of FIG. 7, the EE 306 of the first computing device 104 encrypts the ISO image to form an E-ISO representative of the data to be shared (block 906). The example EE 306 provisions the E-ISO image with the wrapped DEK(s) (block 908). The example first computing device 104 conveys the provisioned E-ISO image to the CSP 102 (block 910). The example of FIG. 9 then ends (block 912).

FIG. 10 begins with the example second computing device 106 of FIG. 1 receiving the E-ISO image provisioned with the wrapped DEK(s) described above from, for example, the archive file database 114 of the CSP 102 (block 1000). The example TEE 302 of the second computing device 106 unwraps the DEK(s) using, for example, the private encryption key corresponding to the second user of the second computing device (block 1002). The unwrapping of the DEK(s) provides the EE 306 of the second computing device 106 with the actual (e.g., usable) DEK(s). In the example of FIG. 10, the EE 306 decrypts the E-ISO image using the unwrapped DEK(s) to obtain access to the ISO image (block 1004). In the illustrated example of FIG. 10, the ISO image is mounted to the OS file system mount point 214 to expose the shared data to the OS of the second computing device 106 as a virtual drive (block 1006). The example of FIG. 10 then ends (block 1008).

Figure 11:
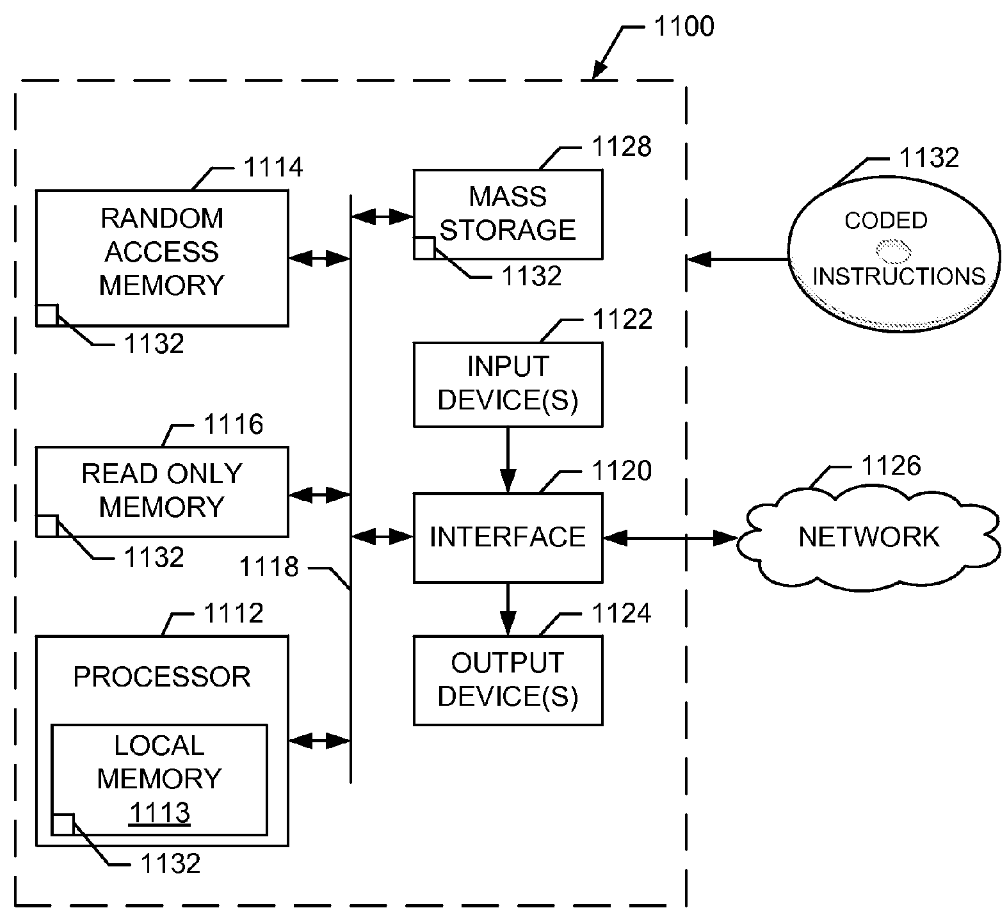
FIG. 11 is a block diagram of an example processor platform capable of executing the example machine-readable instructions of FIG. 7 to implement the example CSP of FIGS. 1-2, capable of executing the example machine-readable instructions of FIG. 8 to implement the example CSP of FIGS. 1-2, capable of executing the example machine-readable instructions of FIG. 9 to implement the example first computing device of FIGS. 1-4 and/or the example second computing device of FIG. 1, and/or capable of executing the example machine-readable instructions of FIG. 10 to implement the example first computing device of FIGS. 1-4 and/or the example second computing device of FIG. 1.

FIG. 11 is a block diagram of an example processor platform 1100 capable of executing the instructions of FIGS. 7 and/or 8 to implement the example key manager 110 and/or the example access policy manager 112 of the example CSP 102 of FIGS. 1 and/or 2, capable of executing the instructions of FIGS. 9 and/or 10 to implement the example first computing device 104 and/or the example second computing device 106 of FIGS. 1-4. The processor platform 1100 can be, for example, a server, a personal computer, a mobile device (e.g., a cell phone, a smart phone, a tablet such as an iPad™), a wearable media device (e.g., Google Glass®), an Internet appliance, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7, 8, 9 and/or 10 may be stored in the mass storage device 1128, in the volatile memory 1114, in the non-volatile memory 1116, and/or on a removable tangible computer readable storage medium such as a CD or DVD.

An example method of securely sharing data disclosed herein includes generating, at a first device of a first user of a cloud service, an archive file representative of a drive of the first device; encrypting, via a processor, the archive file to form an encrypted archive file; and conveying the encrypted archive file to a cloud service provider, the encrypted archive file to be decrypted by a second device of a second user of the cloud service, the decrypted archive file to be mounted to an operating system of the second device.

In some examples, the method includes wrapping an encryption key used to encrypt the archive file using with key data corresponding to the second user.

In some examples, the method comprises provisioning the encrypted archive file with the wrapped encryption key before conveying the encrypted archive file to the cloud service provider.

In some examples, the method includes receiving the key data from the cloud service provider.

In some examples, the method includes conveying access instructions to the cloud service provider to define access privileges to contents of the drive.

In some examples, the method includes, in response to receiving a second encrypted archive file corresponding to second data of a second drive of the second device of the second user, decrypting the second encrypted archive file to generate a second decrypted archive file; and mounting the second decrypted archive file to a second operating system of the first device.

In some examples, generating the archive file comprises generating an ISO image capable of being mounted to an operating system.

An example tangible computer readable storage medium disclosed herein includes instructions that, when executed, cause a machine to at least generate, at a first device of a first user of a cloud service, an archive file representative of a drive of the first device; encrypt the archive file to form an encrypted archive file; and convey the encrypted archive file to a cloud service provider, the encrypted archive file to be decrypted by a second device of a second user of the cloud service, the decrypted archive file to be mounted to an operating system of the second device.

In some examples of the storage medium, the instructions, when executed, cause the machine to wrap an encryption key used to encrypt the archive file with key data corresponding to the second user.

In some examples of the storage medium, the instructions, when executed, cause the machine to provision the encrypted archive file with the wrapped encryption key before conveying the encrypted archive file to the cloud service provider.

In some examples of the storage medium, the key data is received from the cloud service provider.

In some examples of the storage medium, the instructions, when executed, cause the machine to convey access instructions to the cloud service provider to define access privileges to contents of the drive.

In some examples of the storage medium, the instructions, when executed, cause the machine to, in response to receiving a second encrypted archive file corresponding to second data of a second drive of the second device of the second user, decrypt the second encrypted archive file to generate a second decrypted archive file; and mount the second decrypted archive file to a second operating system of the first device.

In some examples of the storage medium, generating the archive file includes generating an ISO image capable of being mounted to an operating system.

An example apparatus disclosed herein includes memory to store data associated with a first user of a cloud service; an archive generator to generate an archive file representative of first data of the memory; an encryption engine to encrypt the archive file to form an encrypted archive file; and a communicator to convey the encrypted archive file to a computing device of a cloud service provider, the encrypted archive file to be decrypted by a second computing device associated with a second user of the cloud service, the decrypted archive file to be mounted to an operating system of the second computing device.

In some examples, the apparatus includes a trusted execution environment to wrap an encryption key used by the encryption engine to encrypt the archive file with a key data corresponding to the second user of the cloud service.

In some examples of the apparatus, the trusted execution environment is to provision the encrypted archive file with the wrapped encryption key before conveying the encrypted archive file to the first computing device of the cloud service provider.

In some examples, the apparatus includes a user interface to convey access instructions to the cloud service provider to define access privileges to contents the first data of the memory.

In some examples of the apparatus, the encryption engine is to, in response to receiving a second encrypted archive file corresponding to second data of a second memory of the second computing device, decrypt the second encrypted archive file to generate a second decrypted archive file.

In some examples, the apparatus includes a mount point to mount the second decrypted archive file to an operating system of the second computing device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of securely sharing data, comprising:

generating, at a first device of a first user of a cloud service, an archive file representative of a drive of the first device;

encrypting, by executing an instruction with a processor, the archive file with an encryption key to form an encrypted archive file;

wrapping, by executing an instruction with the processor, the encryption key with key data associated with a second user of the cloud service;

provisioning the encrypted archive file with the wrapped encryption key; and conveying the provisioned, encrypted archive file to a cloud service provider, the encrypted archive file to be decrypted by a second device of the second user of the cloud service based on the wrapped encryption key, the decrypted archive file to be mounted to an operating system of the second device.

2. A method as defined in claim 1, further including receiving the key data from the cloud service provider.

3. A method as defined in claim 1, further including conveying access instructions to the cloud service provider to define access privileges to contents of the drive.

4. A method as defined in claim 1, further including:

in response to receiving a second encrypted archive file corresponding to second data of a second drive of the second device of the second user, decrypting the second encrypted archive file to generate a second decrypted archive file; and mounting the second decrypted archive file to a second operating system of the first device.

5. A method as defined in claim 1, wherein the archive file is an ISO image capable of being mounted to an operating system.

6. A method as defined in claim 1, wherein the key data associated with the second user of the cloud service is at least one of a private key generated based on a password associated with the second user of the cloud service or a public key associated with the second user.

7. A tangible computer readable storage medium comprising instructions that, when executed, cause a first device of a first user of a cloud service to at least:

generate an archive file representative of a drive of the first device;

encrypt, with an encryption key, the archive file to form an encrypted archive file;

wrap the encryption key with key data associated with a second user of the cloud service;

provision the encrypted archive file with the wrapped encryption key; and convey the provisioned, encrypted archive file to a cloud service provider of the cloud service, the encrypted archive file to be decrypted by a second device of the second user of the cloud service based on the wrapped encryption key, the decrypted archive file to be mounted to an operating system of the second device.

8. A storage medium as defined in claim 7, wherein the key data is received from the cloud service provider.

9. A storage medium as defined in claim 7, wherein the instructions, when executed, cause the first device to convey access instructions to the cloud service provider to define access privileges to contents of the drive.

10. A storage medium as defined in claim 7, wherein the instructions, when executed, cause the first device to:

in response to receiving a second encrypted archive file corresponding to second data of a second drive of the second device of the second user, decrypt the second encrypted archive file to generate a second decrypted archive file; and mount the second decrypted archive file to a second operating system of the first device.

11. A storage medium as defined in claim 7, wherein the archive file is an ISO image capable of being mounted to an operating system.

12. A storage medium as defined in claim 7, wherein the key data associated with the second user of the cloud service is at least one of a private key generated based on a password associated with the second user of the cloud service or a public key associated with the second user.

13. An apparatus, comprising:

memory to store data associated with a first user of a cloud service;

a processor;

an archive generator to generate an archive file representative of first data of the memory;

an encryption engine to encrypt the archive file to form an encrypted archive file with an encryption key;

a trusted execution environment to:

wrap the encryption key with key data associated with a second user of the cloud service; and provision the encrypted archive file with the wrapped encryption key; and a communicator to convey the provisioned, encrypted archive file to a computing device of a cloud service provider, the encrypted archive file to be decrypted by a second computing device of the second user of the cloud service based on the wrapped encryption key, the decrypted archive file to be mounted to an operating system of the second computing device; at least one of the archive generator, the encryption engine, the trusted execution environment, and the communicator implemented by the processor.

14. An apparatus as defined in claim 13, further including a user interface to convey access instructions to the cloud service provider to define access privileges to contents the first data of the memory.

15. An apparatus as defined in claim 13, wherein the encryption engine is to, in response to receiving a second encrypted archive file corresponding to second data of a second memory of the second computing device, decrypt the second encrypted archive file to generate a second decrypted archive file.

16. An apparatus as defined in claim 15, further including a mount point to mount the second decrypted archive file to an operating system of the second computing device.

17. An apparatus as defined in claim 13, wherein the key data associated with the second user of the cloud service is at least one of a private key generated based on a password associated with the second user of the cloud service or a public key associated with the second user.

* * * * *